INVENTOR.
B. J. MAYLAND

Patented July 13, 1954

2,683,656

UNITED STATES PATENT OFFICE 2,683,656

PROCESS CONTROL

Bertrand J. Mayland, Bartlesville, Okla., assignor to Phillips Petroleum Company, a corporation of Delaware Application October 17, 1949, Serial No. 121,819

4 Claims. (Cl. 48—196)

This invention relates to process control. In another aspect, it relates to a novel type of control apparatus.

In carrying out the Fischer-Tropsch synthesis, the synthesis gas is oftentimes manufactured from natural gas and oxygen which are burned in a refractory-lined chamber at temperatures in the range of 2500 to 3000° F. and at pressures up to 400 pounds per square inch to produce a mixture of carbon monoxide and hydrogen. In carrying out this combustion reaction, the ratio of oxygen to natural gas must be very carefully controlled to maintain a proper temperature in the reactor and to minimize formation of undesirable by-products. Heretofore, considerable difficulty has been experienced in properly controlling this combustion reaction in the manner stated and, more particularly, it has been difficult to properly adjust the ratio of oxygen to natural gas.

It is an object of this invention to provide a novel method of and apparatus for controlling the oxygen to natural gas ratio in the manufacture of synthesis gas for the Fischer-Tropsch reaction.

It is a further object to provide an improved control method for other commercial processes wherein the amount of feed materials must be very carefully controlled.

It is a still further object to provide a control device of improved construction for carrying out the aforesaid methods.

Various other objects, advantages and features of the invention will become apparent from the following detailed description taken in conjunction with the accompanying drawings, in which.

Figure 2:
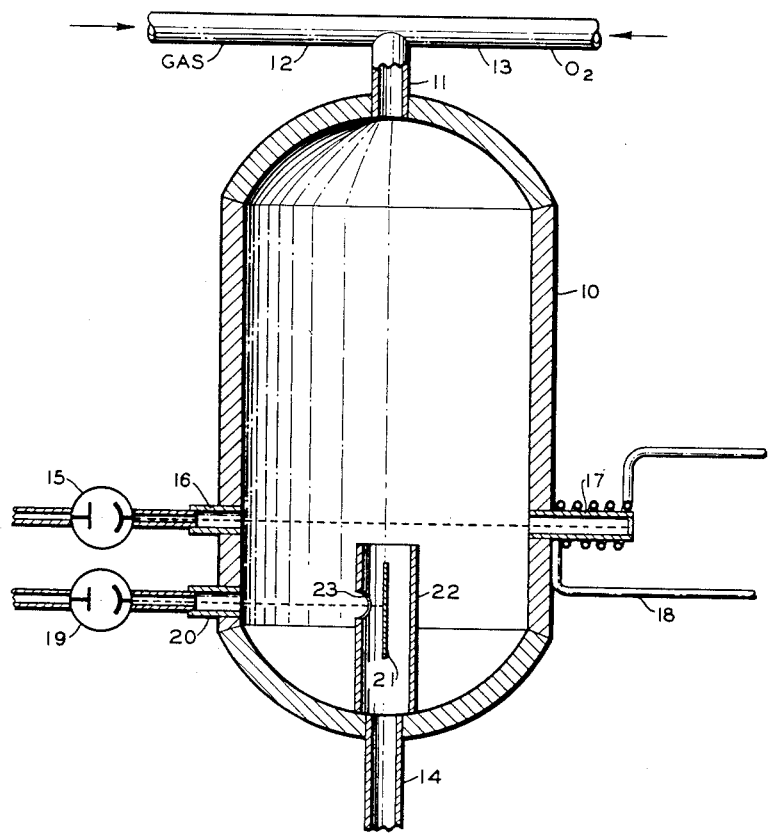
Figure 2 is a vertical, sectional view of a synthesis gas reactor.

Referring now to Figure 2, a reactor 10 is provided with an inlet conduit 11 to which natural gas is admitted through a line 12 and to which air or oxygen is admitted through a line 13. In this reactor, which is lined with refractory material, a temperature of 2500 to 3000° F. is maintained by partial combustion of the natural gas to form a mixture of carbon monoxide and hydrogen which is removed through an outlet conduit 14. It will be understood, of course, that a small amount of carbon dioxide and water vapor are formed together with the carbon monoxide and hydrogen and these substances, together with residual methane from the natural gas, make up the synthesis gas. The temperature in the reactor is controlled by the amount of oxygen present in the feed stream and, in order for the reaction to be carried out under equilibrium conditions, the oxygen-natural gas mole ratio should be about 0.60 to provide a temperature of 2500° F. within the reactor. At this temperature, the amount of residual methane leaving the reactor is negligible and free carbon does not exist. If the amount of oxygen supplied to the reaction is excessive, a large amount of carbon dioxide and water vapor are formed with resultant waste of the oxygen and natural gas admitted to the reactor, and the reactor may be heated to dangerous temperatures. In addition, a synthesis gas containing a relatively high proportion of carbon dioxide and water vapor is unsuitable for the Fischer-Tropsch reaction. In contrast, if the amount of oxygen fed to the reactor is too low, there is a critical temperature at which excessive amounts of free carbon appear in the reactor, thus causing a large increase in operating cost due to the necessity of frequent removal of the free carbon from the reactor.

I have discovered that the reactor temperature affords a sensitive and accurate indication of the presence of excessive oxygen in the feed to the reactor but that a temperature controller cannot be advantageously utilized to determine when the oxygen content of the feed is too low, as there is no sudden drop in temperature at the point of incipient carbon formation. I have also discovered that the presence of free carbon may be directly detected to furnish an indication that the oxygen content of the feed is too low although, of course, a direct measurement of free carbon does not provide a basis for control when the oxygen content of the feed is excessive. By the joint use of these control features, the oxygen content of the feed is readily adjusted to maintain the critical temperature within the reactor at which the production of undesirable by-products such as methane, water vapor and carbon dioxide is substantially decreased while, at the same time, formation of large amounts of free carbon is prevented. In this connection, it is important to note that there are two distinct zones within the reactor. These are the initial combustion zone wherein a high temperature level exists which is insensitive to changes in the oxygen-natural gas ratio in the feed and the equilibrating zone wherein the equilibrium temperature of the reaction is reached, this latter zone being utilized to provide the upper limit of the oxygen-natural gas ratio control point.

Adjacent the equilibrating zone of the reactor 10 is a photoelectric cell 15 which is focused through a sleeve 16 upon a closed sleeve 17 in the opposite wall of the reactor, the sleeve 17 being provided with a coil 18 for the circulation of cooling fluid therethrough. The cell 15 receives radiation only from the gases within the reactor, as the sleeve 17 is cooled well below the reaction temperature, the radiation from these gases in the absence of suspended free carbon, being small and relatively constant. However, when free carbon is suspended in the reactor, it becomes incandescent, thereby producing radiation which produces a large increase in the electrical voltage generated by the cell 15. It will be evident, therefore, that the cell 15 is sensitive to the presence of suspended free carbon in the reactor but it is practically insensitive to changes in temperature.

The control device further includes a photoelectric cell 19 which is focused through a sleeve 20 upon a sheet 21 of a cobalt, chromium, tungsten alloy such as "Stellite" having a low heat capacity, this sheet being disposed in the equilibrating zone of the reactor, and being surrounded by a cylindrical shield 22 of similar material to screen out radiation from the reactor walls. The shield 22 is, of course, provided with a small opening 23 to permit radiation to pass through sleeve 20 to the cell 19. Accordingly, the voltage produced by the cell 19 is proportional to the temperature within the reactor. In some cases, the cell 19 may be focused directly upon the opposite wall of the reactor with resultant elimination of the sheet 21 and shield 22. I have found that this involves some sacrifice of sensitivity in the control device.

In accordance with the invention, photoelectric cell 15 is connected through suitable control mechanism so as to increase the oxygen-natural gas ratio when the output voltage increases beyond a predetermined value responsive to the presence of free carbon within the reactor. Photoelectric cell 19 is so connected as to actuate control mechanism to reduce the oxygen-natural gas ratio when the reactor temperature increases above a predetermined level. In this manner, optimum reaction conditions are maintained in the vessel 10 so as to provide a synthesis gas substantially free from methane, and containing only minimum amounts of carbon dioxide and water vapor, and to prevent deposition of an excessive amount of uncombined carbon within the reactor.

Figure 1:
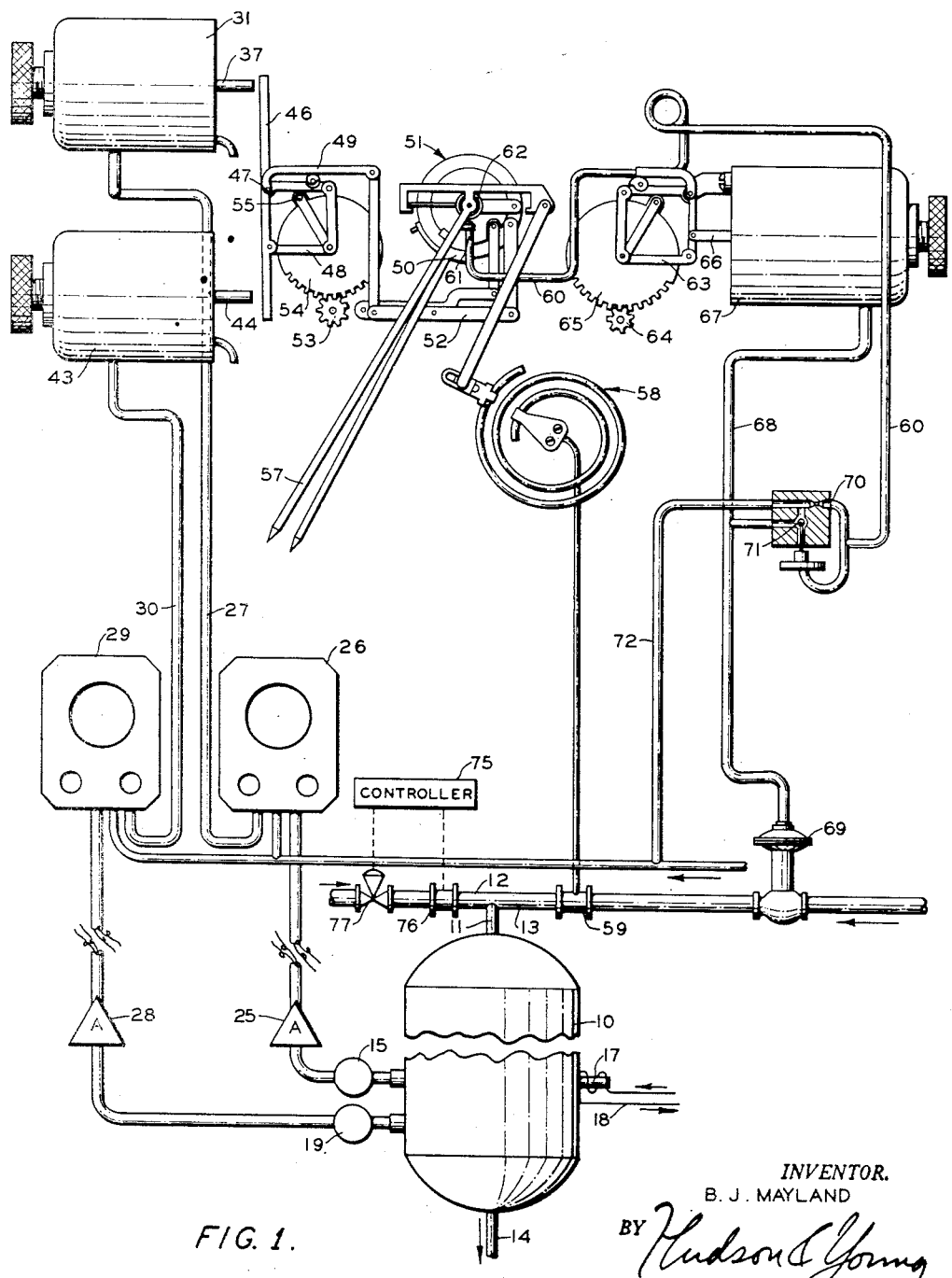
Figure 1 is a flow diagram illustrating my novel method and the apparatus for carrying it out, a portion of the control apparatus being shown in detail.

The control mechanism referred to is shown in detail by Figure 1 wherein the parts already described are indicated by like reference characters. Referring now to this figure, it will be noted that photoelectric cell 15 is connected through an amplifier 25 to an electronic controller 26 which produces a variable air pressure in a conduit 27, this air pressure being proportional to the output voltage produced by the cell 15. Similarly, photoelectric cell 19 is connected through an amplifier 28 to an electronic controller 29 which produces a variable air pressure in a conduit 30, this air pressure being proportional to the output voltage of photoelectric cell 19.

Figure 3:
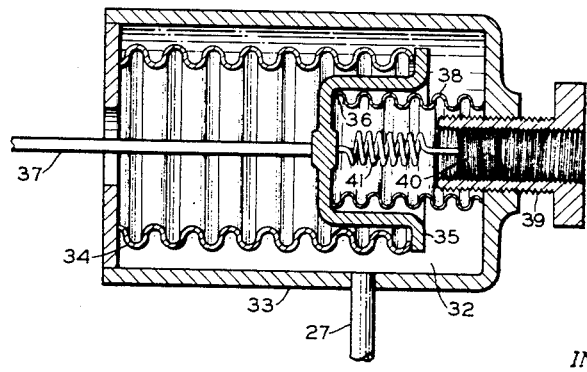
Figure 3 is a vertical, sectional view of one of the control elements of Figure 1.

The conduit 27 leads to a pressure sensitive element 31 which is shown in detail by Figure 3, from which it will be noted that the air pressure within the inlet conduit is transmitted to a chamber 32 defined by a cylindrical casing 33 and a bellows 34, one end of which is attached to the casing and the other end of which is attached to a flanged portion 35 of a cup-shaped actuating member 36. Mounted upon the member 36 is a push rod 37 which extends through a suitable opening in the casing. A second bellows 38 is mounted between the casing and member 36, this bellows having a threaded adjusting nut 39 protruding into the interior thereof, this nut carrying a block 40 to which is secured one end of a spring 41, the other end of this spring being attached to the member 36. It will be apparent that an increase in air pressure in conduit 27 will cause push rod 37 to move outwardly whereas a decrease in air pressure will cause push rod 37 to move inwardly responsive to the action of spring 41, the sensitivity of the device being governed by the position of adjusting nut 39. The conduit 30 is attached, in the same manner, to a similar pressure sensitive device 43 having a push rod 44 protruding therefrom.

The push rods 37, 44 are adapted to engage opposite ends of a lever 46 which is pivoted at 47 to a suitable support. This lever forms a part of a parallelogram linkage 48 having a movable arm 49 which operates the set pointer assembly 50 of a conventional controller 51 through lever 52. It will be evident that outward movement of push rod 37 will produce a movement of set pointer assembly 50 in one direction whereas outward movement of push rod 44 will move the set pointer assembly in the opposite direction. The amount of set pointer movement per unit movement of lever 46 is governed by a gear 53 meshing with a gear 54 carrying an adjustable pivoted arm 55 of the parallelogram linkage 48.

The controller 51 also includes a recording pen 57 which is actuated by a Bourdon tube assembly 58 regulated by a flowmeter 59 in the oxygen supply conduit 13. Thus, the position of pen arm 57 is controlled by the rate of flow of oxygen to the reactor 10. The controller 51 also includes a bleed line 60 which terminates at a nozzle 61 supported adjacent a baffle plate 62 which is jointly adjustable by the pen arm assembly and by the position of set pointer assembly 50. The vertical position of nozzle 61 is controlled by a parallelogram linkage 63 having sensitivity adjusting gears 64, 65 and which is actuated by a push rod 66 of a third pressure sensitive element 67, this element being similar to the one shown by Figure 3. Fluid under pressure is supplied to the pressure sensitive element 67 from a conduit 68 which pressure is adjusted jointly by an automatic control valve 69 regulating the flow of oxygen through conduit 13 and by a relay valve 70, this valve having an inner chamber in which is suspended a ball 71. This ball controls the proportion of air passing from a supply line to the conduit 68 and to the bleed line 60. As is well understood in the art, the nozzle 61, pen arm assembly 57, pressure sensitive element 67, relay valve 70, and control valve 69 all cooperate to regulate the flow of oxygen through the line 13 in such fashion as to make the position of pen arm 57 coincide with that of the set pointer.

If the flow of oxygen through line 13 is greater than that determined by the set pointer, the baffle 62 is moved further from nozzle 61 by movement of pen arm 57 away from the set pointer, thereby allowing a greater quantity of air to pass through bleed line 60 with the result that the pressure in conduit 68 is reduced and valve 69 is moved toward closed position to reduce the flow of oxygen through the conduit 13. In contrast, if the oxygen supply is less than that predetermined by set pointer 50, baffle 62 moves closer to nozzle 61 with the result that less air passes through bleed line 60 with resultant increase in pressure in conduit 68 which causes opening of valve 69 to increase the oxygen supply. The pressure sensitive device 67, parallelogram linkage 63 and associated parts prevent overshooting of the control. That is, if the pen arm 57 is close to the set pointer, a relatively slow adjustment is made whereas, if the pen arm is remote from the set pointer, the adjustment is more rapid.

In a preferred embodiment of the invention, a constant flow of natural gas is maintained through conduit 12 by a controller 75 having a flow sensitive device 76 positioned in the conduit and controlling an automatic valve 77.

The overall operation of my novel control system will now be apparent to those skilled in the art. Assuming that natural gas is fed to the reactor from conduit 12 at a constant rate, and that oxygen is fed to the reactor through conduit 13 at a rate determined by the setting of valve 69, an excessive temperature in the equilibrating section of the reactor 10 will produce an increased voltage in photoelectric cell 19, which, through the medium of controller 29, produces an increased air pressure in conduit 30 and an outward movement of push arm 44. This movement of push arm 44 is transmitted through lever 46, linkage 48 and lever 52 to the set pointer assembly 50, causing a rotation thereof in such direction as to decrease the control point on the controller 51. Thereupon, valve 69 is automatically adjusted through cooperation of nozzle 61 and baffle 62 so as to reduce the amount of oxygen passing through conduit 13 until the position of pen arm 57 coincides with that of the set pointer. The decreased flow of oxygen produces a rapid reduction in the reactor temperature to its optimum value.

In a similar manner, formation of uncombined carbon in an excessive amount within the reactor 10 produces an increased current in the photoelectric cell 15 which, through the agency of controller 26, produces an increased air pressure in conduit 27 and an outward movement of push arm 37. This moves lever 46 in an opposite direction to the motion produced by push arm 44 and causes the control point of the unit 51 to be decreased through movement of set pointer assembly 50 by linkage 48 and lever 52.

Thereupon, the baffle 62 and nozzle 61 cooperate to increase the air pressure in conduit 68 and open valve 69. As a result, the oxygen feed to the reactor is increased with the result that deposition of uncombined carbon is eliminated. It will be evident, therefore, that I have achieved a major object of my invention in automatically regulating the flow of oxygen to the controller so as to prevent excessive temperatures within the reactor and also to prevent deposition of uncombined carbon. As a result, the synthesis gas passing to the Fischer-Tropsch reaction is accurately of a predetermined composition consisting essentially of carbon monoxide and hydrogen. The application of my control method and system to other processes will be evident to those skilled in the art.

An important feature of my invention resides in the dual control of the position of the set pointer assembly by the pressure sensitive elements 31 and 43. It will be noted that outward movement of push arm 37 moves the set pointer in one direction through action of linkage 48 and lever 52. Subsequent movement of push arm 37 in the opposite direction, however, does not return the set pointer to its original position since the lever 46 is not rigidly connected to the push arm. Accordingly, once lever 46 is moved by push arm 37, for example, it stays in position due to the inertia of the linkage system until it is again moved either in a reverse direction by outward movement of push arm 44 or an additional distance in its original direction by a further movement of push arm 37. This arrangement, therefore, permits control of a process by two measured variables, in this case temperature and carbon deposition, without any interference being established in the control system through interaction of the measured variables.

Parallelogram linkages 48 and 63, set pointer assembly 50, pressure sensitive element 67, and valve 70 are illustrated and explained in "Instruments and Process Control" by the New York State Vocational and Practical Arts Association, Delmar Publishers, Inc., Albany, N. Y., 1945, pages 40–41, 54–59 and 134–139, and in U. S. Patent 2,361,885 (1944), Tate et al.

While the invention has been described in connection with a present, preferred embodiment thereof, it is to be understood that this description is illustrative only and is not intended to limit the invention, the scope of which is defined by the appended claims.

I claim:

1. Apparatus for controlling a reaction wherein a synthesis gas consisting essentially of carbon monoxide and hydrogen is formed by the partial combustion of methane in oxygen which comprises, in combination, a reactor having inlet and outlet conduits, a photoelectric cell focused upon a surface in said reactor, a second photoelectric cell, an opening in said reactor opposite said second photoelectric cell, means for focusing said second cell upon said opening, a line for supplying oxygen to said inlet conduit, an automatic control valve in said line, a controller for operating said valve, means for feeding the output of said first cell to said controller to close said valve when the photoelectric current rises above a predetermined value, and means for feeding the output of said second photoelectric cell to said controller to open said valve when the photoelectric current rises above a predetermined value.

2. Apparatus for controlling a reaction wherein a synthesis gas consisting essentially of carbon monoxide and hydrogen is formed by the partial combustion of methane in oxygen which comprises, in combination, a reactor having inlet and outlet conduits, a photoelectric cell focused upon a surface in said reactor, a second photoelectric cell, an opening in said reactor opposite said second photoelectric cell, means for focusing said photoelectric cell on said opening, a pair of voltage amplifiers, a pair of electronic controllers actuated, respectively, by said amplifiers, means for feeding the output of said photoelectric cells to the respective amplifiers, a line for supplying oxygen to said inlet conduit, an automatic control valve in said line, a pneumatic controller for operating said valve, an air line connecting one of said electronic controllers to said pneumatic controller to close said valve when the photoelectric current in said first cell rises above a predetermined value, an air line connecting said second electronic controller to said pneumatic controller to open said valve when the photoelectric current in said second cell rises above a predetermined value, a line for supplying methane to said inlet conduit, and a controller for maintaining a constant rate of flow in said methane line.

3. Apparatus for controlling a reaction wherein a synthesis gas consisting essentially of carbon monoxide and hydrogen is formed by the partial combustion of methane in oxygen which comprises, in combination, a reactor having inlet and outlet conduits, a photoelectric cell focused upon a surface in said reactor, a second photoelectric cell, an opening in said reactor opposite said second photoelectric cell, means for focusing said photoelectric cell on said opening, a pair of voltage amplifiers, a pair of electronic controllers actuated, respectively, by said amplifiers, means for feeding the output of said photoelectric cells to the respective amplifiers, a line for supplying oxygen to said inlet conduit, an automatic control valve in said line, a pneumatic controller for operating said valve, said pneumatic controller including a movable pen arm assembly for recording the oxygen flow rate in said line and for controlling said valve together with a set pointer for determining the control point of said pen arm, a linkage for actuating said set pointer including a pivoted lever, a bellows at each end of said lever, a push arm on each bellows which is engagable with the adjacent end of said lever, and a pair of air lines for connecting the respective electronic controllers to said bellows.

4. An apparatus for controlling the hydrogen and carbon monoxide contents of synthesis gas produced in a process in which a hydrocarbon gas is reacted with oxygen to produce said synthesis gas, said apparatus comprising in combination: a reactor; means for supplying hydrocarbon gas to said reactor; an oxygen inlet to said reactor; an effluent line attached to said reactor; a control valve in said oxygen inlet; a closed tube attached to said reactor adjacent an initial combustion zone therein and adapted to be maintained at a temperature lower than that of the interior of said reactor; a refractory member positioned in an equilibrating zone in said reactor; a photoelectric cell adapted to be focused on the interior of said closed tube; another photoelectric cell adapted to be focused on said refractory member; means responsive to the voltage output of said first-mentioned photoelectric cell and adapted to open said control valve when the voltage output of said first-mentioned photoelectric cell exceeds a predetermined amount responsive to the presence of incandescent carbon in said initial combustion zone; and means responsive to the voltage output of said second-mentioned photoelectric cell and adapted to throttle said control valve when the voltage output of said second-mentioned photoelectric cell exceeds a predetermined amount responsive to the radiation of said refractory member.

References Cited in the file of this patent

UNITED STATES PATENTS

| Number | Name | Date |
| --- | --- | --- |
| 1,156,412 | Lincoln | Oct. 12, 1915 |
| 1,258,346 | Lincoln | Mar. 5, 1918 |
| 1,305,227 | Lincoln | May 27, 1919 |
| 1,728,929 | Ernst et al. | Sept. 24, 1929 |
| 1,923,865 | Handforth | Aug. 22, 1933 |
| 1,960,912 | Larson | May 29, 1934 |
| 1,962,676 | Albright | June 12, 1934 |
| 2,081,170 | Dreffein | May 25, 1937 |
| 2,171,596 | Parker | Sept. 5, 1939 |
| 2,310,298 | Kuhl et al. | Feb. 9, 1943 |
| 2,361,885 | Tate et al. | Oct. 31, 1944 |
| 2,375,820 | Ridings et al. | May 15, 1945 |
| 2,393,960 | Allen | Feb. 5, 1946 |
| 2,483,132 | Gaucher | Sept. 27, 1949 |
| 2,562,507 | Pierce | July 31, 1951 |

FOREIGN PATENTS

| Number | Country | Date |
| --- | --- | --- |
| 711,586 | France | Sept. 12, 1931 |
| 300,328 | Great Britain | Nov. 15, 1928 |

OTHER REFERENCES

"Industrial and Engineering Chemistry," Sept. 1945, pages 816–820.

Chemical and Metallurgical Engineering, May 1943, pages 108 to 125.